(12) United States Patent
Akazawa

(10) Patent No.: US 12,141,210 B2
(45) Date of Patent: Nov. 12, 2024

(54) SYSTEM, TERMINAL DEVICE, METHOD, AND PROGRAM FOR PROVIDING COOKING INFORMATION

(71) Applicant: Nippon Telegraph and Telephone Corporation, Tokyo (JP)

(72) Inventor: Hosei Akazawa, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 178 days.

(21) Appl. No.: 17/623,713

(22) PCT Filed: Jul. 3, 2019

(86) PCT No.: PCT/JP2019/026433
§ 371 (c)(1),
(2) Date: Dec. 29, 2021

(87) PCT Pub. No.: WO2021/001959
PCT Pub. Date: Jan. 7, 2021

(65) Prior Publication Data
US 2022/0245198 A1 Aug. 4, 2022

(51) Int. Cl.
*G06F 16/9038* (2019.01)
*G06F 16/9032* (2019.01)

(52) U.S. Cl.
CPC .... *G06F 16/9038* (2019.01); *G06F 16/90328* (2019.01)

(58) Field of Classification Search
CPC ......... G06F 16/24575; G06F 16/90328; G06F 16/9038
(Continued)

(56) References Cited

U.S. PATENT DOCUMENTS

| 8,200,548 B2* | 6/2012 | Wiedl | G06Q 30/02 |
| | | | 705/26.5 |
| 2015/0088692 A1* | 3/2015 | Fung | G06Q 30/0623 |
| | | | 705/26.61 |

(Continued)

FOREIGN PATENT DOCUMENTS

| JP | H08-339397 A | 12/1996 |
| JP | 2002-99562 A | 4/2002 |

OTHER PUBLICATIONS

*Top 10 Cooking App Rankings*, Appliv, Jun. 3, 2019, https://appliv.ip/foods/cooking/0071, pp. 1-3.
(Continued)

*Primary Examiner* — Hung T Vy
(74) *Attorney, Agent, or Firm* — Workman Nydegger

(57) ABSTRACT

Information for selecting a food menu item based on an ingredient is provided to a user. In a user terminal device such as a smartphone, when a category is selected on an initial screen, the screen shifts to a large category screen. When "TORI-NIKU (CHICKEN)" is selected, the screen shifts to a sub-category screen. Alternatively, when "AIUEO (JAPANESE ALPHABET)" is selected on the initial screen and "TO" is selected on a character palette screen, a screen including ingredients having names each beginning with "TO" is displayed and, when "TORI-NIKU" is selected, the screen shifts to the sub-category screen. When "SASAMI (CHICKEN FILLET)" is selected on the sub-category screen, the screen shifts to a second ingredient selection screen. Under and on the right side of "SASAMI", "SALAD HOURENSO (SPINACH)", "ZA-SAI (PICKLED MUSTARD STEM)", "NEGI (GREEN ONION)", "PIMAN (GREEN PEPPER)", and the like each as only one ingredient or a matching ingredient are displayed.

3 Claims, 10 Drawing Sheets

(58) Field of Classification Search
USPC .......................................................... 707/722
See application file for complete search history.

(56) References Cited

U.S. PATENT DOCUMENTS

| | | | |
|---|---|---|---|
| 2017/0097934 A1* | 4/2017 | Aso | G06Q 30/02 |
| 2019/0188775 A1* | 6/2019 | Rivoli | G06Q 30/0631 |
| 2020/0110518 A1* | 4/2020 | Suh | G06F 16/9535 |

OTHER PUBLICATIONS

Hasegawa, *Realization of Search Suggestion Function by Apache Solr*, Excite Japan, col., Ltd, Excite Official Engineer Blog, https://web.archive.org/web/20170830080628/https://blog.excite.co.jp/exdev/26474941/, Oct. 24, 2016, pp. 1-5.

\* cited by examiner

Fig. 9

| LARGE CATEGORIES | SUB-CATEGORIES |
|---|---|
| BEEF | THINLY SLICED BEEF<br>BEEF LUMP<br>BEEF SHANK<br>ROASTED BEEF<br>LIVER/OFFAL/TANG |
| PORK | THICKLY SLICED PORK<br>THINLY SLICED PORK<br>PORK LUMP<br>GROUND PORK<br>ROASTED PORK<br>LIVER/OFFAL |
| CHICKEN | CHICKEN BREAST<br>CHICKEN LEG<br>CHICKEN FILLET<br>GROUND CHICKEN<br>CHICKEN WING<br>LIVER/OFFAL |
| PROCESSED MEAT | SAUSAGE<br>HAM<br>BACON<br>RAW HAM |
| FISH | JACK MACKEREL<br>SARDINE<br>SALMON<br>MACKEREL<br>MACKEREL PIKE<br>TUNA<br>BONITO<br>SEA BREAM<br>SPANISH MACKEREL<br>JAPANESE BARRACUDA<br>COD<br>CUTLASS FISH<br>RIGHT-EYE FLOUNDER<br>LEFT-EYE FLOUNDER<br>CHANNEL ROCKFISH<br>BLACK ROCKFISH<br>FOX JACOPEVER |
| SHELLFISH | JAPANESE LITTLENECK CLAM<br>FRESHWATER CLAM<br>YELLOW CLAM<br>BLOODY CLAM<br>MUSSEL<br>SURF CLAM<br>OYSTER<br>SCALLOP<br>HORNED TURBAN<br>ABALONE<br>SEA SQUIRT |
| OTHER SEAFOOD | WHITEBAIT<br>WAKAME KELP<br>HIJIKI KELP<br>MOZUKU KELP |

| LARGE CATEGORIES | SUB-CATEGORIES |
|---|---|
| ROOT VEGETABLES | CHINESE RADISH<br>TURNIP<br>ONION<br>CARROT<br>BURDOCK<br>LOTUS ROOT<br>WAX GOURD<br>LILY BULB |
| GREEN VEGETABLES | SPINACH<br>SALAD SPINACH<br>POTHERB MUSTARD<br>JAPANESE MUSTARD SPINACH<br>CHINESE CABBAGE<br>PAK CHOI<br>GREEN ONION<br>CHIVE<br>MITSUBA<br>PARSLEY<br>CABBAGE<br>LETTUCE<br>CHINESE CHIVE<br>GARLIC SCAPE<br>JEW'S MALLOW<br>HOSTA<br>CILANTRO<br>WHITE RADISH SPROUT |
| OTHER VEGETABLES | GREEN PEPPER<br>PUMPKIN<br>MANGANJI PEPPER<br>SWEET GREEN PEPPER<br>EGGPLANT<br>BROCCOLI<br>CAULIFLOWER<br>CELERY<br>GREEN BEANS<br>ASPARAGUS<br>BEAN SPROUT<br>AVOCADO<br>BAMBOO SHOOT<br>GINKGO NUT<br>EDIBLE CHRYSANTHEMUM |
| POTATOES | POTATO<br>SWEET POTATO<br>TARO |
| MUSHROOMS | SHIITAKE MUSHROOM<br>SHIMEJI MUSHROOM<br>STRAW MUSHROOM<br>OYSTER MUSHROOM<br>NAMEKO MUSHROOM<br>MUSHROOM<br>WOOD EAR MUSHROOM |

| LARGE CATEGORIES | SUB-CATEGORIES |
|---|---|
| EGG, TOFU, AND BEANS | CHICKEN EGG<br>QUAIL EGG<br>TOFU<br>THIN DEEP-FRIED TOFU<br>THICK DEEP-FRIED TOFU<br>FERMENTED SOYBEANS |
| PASTE PRODUCTS | STEAMED FISH CAKE<br>TUBE-SHAPED FISH CAKE<br>SOFT WHITE FISH CAKE<br>DEEP-FRIED FISH CAKE |
| DRIED PRODUCTS | DRIED HIJIKI KELP<br>DRIED STRIPS OF CHINESE RADISH<br>FREEZE-DRIED TOFU<br>GLASS NOODLE<br>DRIED SAKURA SHRIMP<br>DRIED SPLIT SHRIMP<br>DRIED SCALLOP<br>DRIED DONKO SHIITAKE MUSHROOM<br>DRIED YOUNG SARDINE |

Fig. 10

| RECIPE NAME | INGREDIENT NAME 1 | INGREDIENT NAME 2 |
|---|---|---|
| LILY BULB DRESSED WITH PASTED PICKLED UME | LILY BULB | WOOD EAR MUSHROOM |
| TEA-CEREMONY-STYLE TARO | TARO | DRIED YOUNG SARDINE WITH CHINESE PEPPER |
| LIVER STEAK | LIVER | BACON |
| VEGETABLES ROLLED WITH ROASTED PORK | THINLY SLICED ROASTED PORK | WHITE RADISH SPROUT |
| RAW HAM SALAD | SCRAPS OF RAW HAM | AVOCADO |
| ITALIAN COLD OCTOPUS | BOILED OCTOPUS | GREEN ONION |
| GRILLED VEGETABLES MARINATED IN SOY SAUCE DRESSING | SHIITAKE MUSHROOM | MANGANJI PEPPER |
| VINEGARED CHRYSANTHEMUM | EDIBLE CHRYSANTHEMUM | TUBE-SHAPED FISH CAKE |
| FRIED SWEET GREEN PEPPER | SWEET GREEN PEPPER | WHITEBAIT |
| SARDINE SIMMERED WITH PICKLED UME | SARDINE | PLUM |
| CHICKEN AND SPINACH SALAD | CHICKEN FILLET | SALAD SPINACH |

SYSTEM, TERMINAL DEVICE, METHOD, AND PROGRAM FOR PROVIDING COOKING INFORMATION

TECHNICAL FIELD

The present disclosure relates to provision of cooking information, and more particularly to a system for providing information for connecting an ingredient to a recipe, a terminal device, a method, and a program.

BACKGROUND ART

Conventionally, knowledge about cooking is mostly gained by viewing a cooking program on television or through real experiment in a cooking class or acquired by referring to a cooking book. In recent years, there is personal computer software including food menu items and recipes thereof, and it is also possible to obtain information from the Internet. However, a major part of the information includes, for one food menu item, a photograph of cooked food, a variety of required ingredients, and a cooking process (see, e.g., NPL 1).

CITATION LIST

Non Patent Literature

[NPL 1] Cooking Application Ranking TOP 10, Internet URL: https://app-liv.jp/foods/cooking/0071

SUMMARY OF THE INVENTION

One problem with a cooking book or a cooking site as described above is that food menu items are listed first, followed by ingredients and cooking processes corresponding thereto. When a meal is to be cooked based on a cooking book, a food menu item to be cooked on that day is determined first before a trip to a supermarket, and then ingredients to be obtained are purchased. However, in most cases, a shopper finds best bargains at a supermarket only after arriving there unless the shopper checked a newspaper insert or the like. When a food menu item is selected in advance, ingredients to be purchased are automatically determined. As a result, the ingredients are not always cheaply available on that day, and the shopper ends up purchasing the ingredients at full retail prices. This is a budget-unfriendly shopping behavior.

Nowadays, in terms of effective use of resources, food waste is a worldwide issue. While some countries suffer from poverty and cannot have enough meals, a so-called food abundant situation continues in developed countries. A sign of food waste comes in clearance items at supermarkets. While some cooking experts purchase only clearance items and cook meals therefrom, a majority of persons who do not know how to cook ingredients cannot fix anything but the same old menu items from safe regular-priced items.

Needless to say, preparing meals is a most challenging task to do for a time-pressed dual-income couple. However, it is considered that, once the couple learns skill to successfully cook a cheaply available ingredient in a short time with no stress, the skill provides a great help in promoting gender equality.

At present, numerous cooking books are displayed in book stores, but a majority of recipes, even though referred to as easy recipes, actually require a variety of ingredients and most cooking processes include a large number of steps. Actually, it is difficult to plan a daily meal and do shopping unless a person who cooks thoroughly reads such a book in advance and realizes what ingredients and what process are required by individual recipes to have higher-level knowledge. It is unrealistic to do shopping at a supermarket, while looking at a cooking book. However, if the shopper can immediately get information about what to additionally purchase as another ingredient going well with a clearance item found at the supermarket to be able to prepare a perfect meal on his or her smartphone, the shopper may be determined to purchase the ingredient matching the clearance item without hesitation. As a result, this will hopefully lower mental and time-related hurdles to cooking. In addition, a reduction in food waste is also expected.

The disclosure of this application is achieved in view of such a problem, and an object thereof is to provide information for selecting a food menu item based on an ingredient, not for selecting an ingredient based on a food menu item.

An embodiment of the present invention is a system including: a user terminal device; a server device; and a database including cooking recipes, the server device including a search unit configured to: search the database based on information about a first ingredient from the user terminal device and acquire a second ingredient to be cooked together with the first ingredient; search the database based on a specification of the second ingredient from the user terminal device and acquire the cooking recipe including the first ingredient and the second ingredient; and search the database based on a specification of the first ingredient as only one ingredient from the user terminal device and acquire the cooking recipe including only the first ingredient, the user terminal device including a screen display unit configured to: display a screen including a list of the first ingredient and the second ingredient; display a screen including the cooking recipe including the first ingredient and the second ingredient in response to a specification of the second ingredient in the list; and display a screen including the cooking recipe including only the first ingredient in response to a specification of the first ingredient as the only one ingredient in the list.

Another embodiment of the present invention is a server device connected to a user terminal device, the server device including: a search unit configured to: search a database based on information about a first ingredient from the user terminal device and acquire a second ingredient to be cooked together with the first ingredient; search the database based on a specification of the second ingredient from the user terminal device and acquire a cooking recipe including the first ingredient and the second ingredient; and search the database based on a specification of the first ingredient as only one ingredient from the user terminal device and acquire a cooking recipe including only the first ingredient.

Still another embodiment of the present invention is a method to be implemented by a system including a user terminal device, a server device, and a database including cooking recipes, the method including the steps of: the server device searching the database based on information about a first ingredient from the user terminal device and acquiring a second ingredient to be cooked together with the first ingredient; the user terminal device displaying a screen including a list of the first ingredient and the second ingredient; the server device searching the database based on a specification of the second ingredient from the user terminal device and acquiring the cooking recipe including the first ingredient and the second ingredient; the user terminal device displaying a screen including the cooking recipe including the first ingredient and the second ingredient in response to a specification of the second ingredient in the list; the server device searching the database based on a specification of the first ingredient as only one ingredient from the user terminal device and acquiring the cooking recipe including only the first ingredient; and the user terminal device displaying a screen including the cooking recipe including only the first ingredient in response to a specification of the first ingredient as the only one ingredient in the list.

Yet another embodiment of the present invention is a method to be implemented by a server device connected to a user terminal device, the method including the steps of: searching a database based on information about a first ingredient from the user terminal device and acquiring a second ingredient to be cooked together with the first ingredient; searching the database based on a specification of the second ingredient from the user terminal device and acquiring a cooking recipe including the first ingredient and the second ingredient; and searching the database based on a specification of the first ingredient as only one ingredient from the user terminal device and acquiring a cooking recipe including only the first ingredient.

Still another embodiment of the present invention is a program for causing a processor included in a server device connected to a user terminal device to perform the steps of: searching a database based on information about a first ingredient from the user terminal device and acquiring a second ingredient to be cooked together with the first ingredient; searching the database based on a specification of the second ingredient from the user terminal device and acquiring a cooking recipe including the first ingredient and the second ingredient; and searching the database based on a specification of the first ingredient as only one ingredient from the user terminal device and acquiring a cooking recipe including only the first ingredient.

Yet another embodiment of the present invention is a user terminal device including: a search unit; and a screen display unit, the search unit being configured to: search a database based on information about a first ingredient and acquire a second ingredient to be cooked together with the first ingredient; search the database based on a specification of the second ingredient and acquire a cooking recipe including the first ingredient and the second ingredient; and search the database based on a specification of the first ingredient as only one ingredient and acquire a cooking recipe including only the first ingredient, the screen display unit being configured to: display a screen including a list of the first ingredient and the second ingredient; display a screen including the cooking recipe including the first ingredient and the second ingredient in response to a specification of the second ingredient in the list; and display a screen including the cooking recipe including only the first ingredient in response to a specification of the first ingredient as the only one ingredient in the list.

Still another embodiment of the present invention is a method to be implemented by a user terminal device, the method including the steps of: searching a database based on information about a first ingredient and acquiring a second ingredient to be cooked together with the first ingredient; displaying a screen including a list of the first ingredient and the second ingredient; searching the database based on a specification of the second ingredient and acquiring a cooking recipe including the first ingredient and the second ingredient; displaying a screen including the cooking recipe including the first ingredient and the second ingredient in response to a specification of the second ingredient in the list; searching the database based on a specification of the first ingredient as only one ingredient and acquiring a cooking recipe including only the first ingredient; and displaying a screen including the cooking recipe including only the first ingredient in response to a specification of the first ingredient as the only one ingredient in the list.

Yet another embodiment of the present invention is a program for causing a processor included in a user terminal device to perform the steps of: searching a database based on information about a first ingredient and acquiring a second ingredient to be cooked together with the first ingredient; displaying a screen including a list of the first ingredient and the second ingredient; searching the database based on a specification of the second ingredient and acquiring a cooking recipe including the first ingredient and the second ingredient; displaying a screen including the cooking recipe including the first ingredient and the second ingredient in response to a specification of the second ingredient in the list; searching the database based on a specification of the first ingredient as only one ingredient and acquiring a cooking recipe including only the first ingredient; and displaying a screen including the cooking recipe including only the first ingredient in response to a specification of the first ingredient as the only one ingredient in the list.

As described above, according to the embodiment of the present invention, it is possible to provide information for selecting a food menu item based on an ingredient, not for selecting an ingredient based on a food menu item.

BRIEF DESCRIPTION OF DRAWINGS

FIG. 9 is a diagram illustrating a database according to the embodiment of the present invention.

FIG. 10 is a diagram illustrating the database according to the embodiment of the present invention.

DESCRIPTION OF EMBODIMENTS

Figure 1:
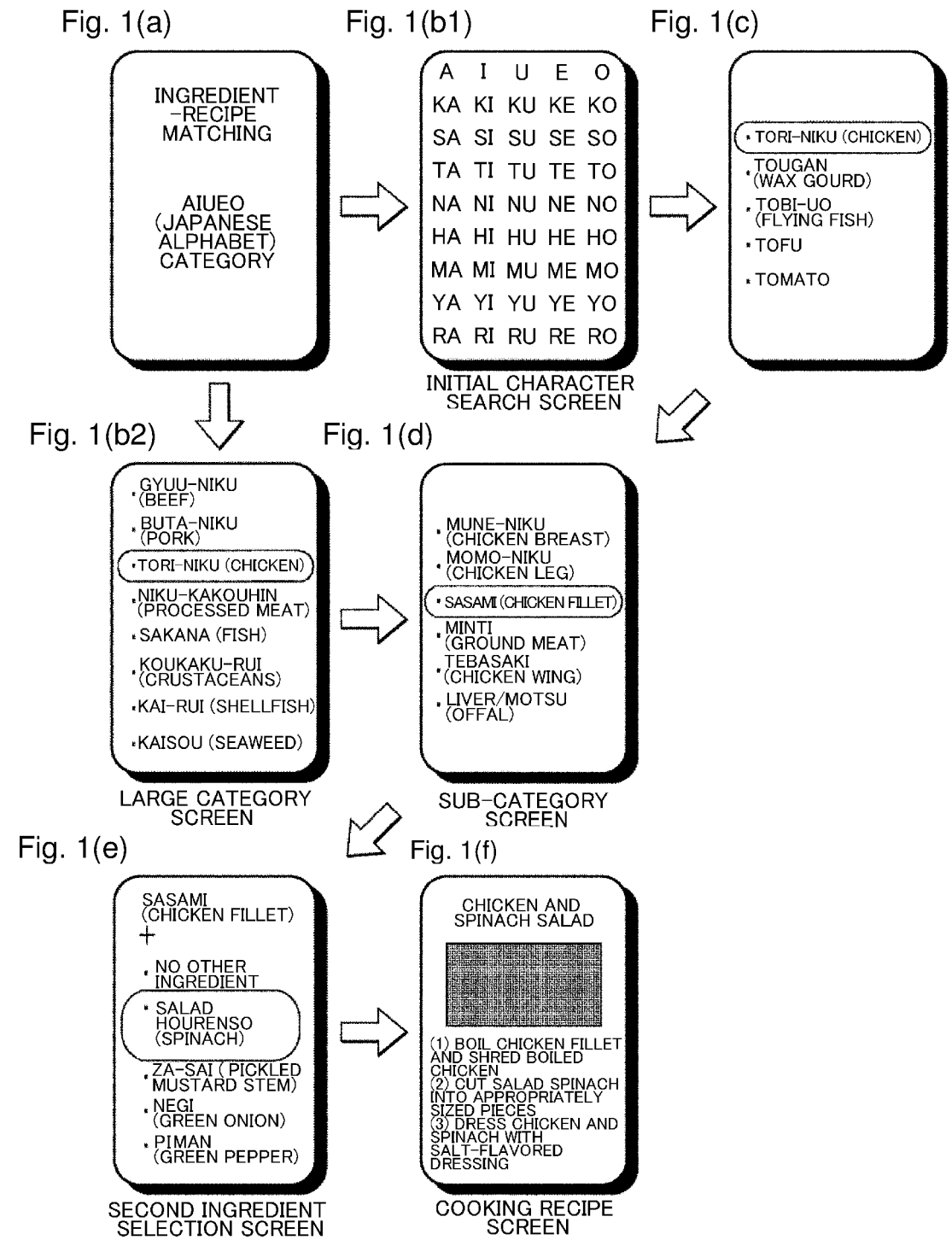
FIG. 1 is a configuration diagram illustrating an example of transitions of a screen of a user terminal device according to an embodiment of the present invention.

Referring to the drawings, a detailed description will be given of an embodiment of the present invention. The same or similar reference numerals denote the same or similar components, and a repeated description thereof is omitted.

The present embodiment allows information for selecting a food menu item based on an ingredient, not for selecting an ingredient based on a food menu item, to be provided to a user. In the present embodiment, the user can obtain information about a food menu item based on an ingredient by using a user terminal device.

FIG. 1 illustrates an example of transitions of a screen of an application program (hereinafter referred to also as "appli") to be executed in the user terminal device according to the present embodiment. FIG. 1(a) illustrates an initial screen. The initial screen includes title characters "INGREDIENT-RECIPE MATCHING" of the application and two options of "AIUEO (JAPANESE ALPHABET)" and "CATEGORY" which represent selectable search methods. The search method represented by "AIUEO" is an initial character search. The search method represented by "CATEGORY" is a category search. When "AIUEO" is selected by the user, the screen shifts to FIG. 1(b1) while, when "CATEGORY" is selected by the user, the screen shifts to FIG. 1(b2).

FIG. 1(b1) illustrates an example of the screen for the initial character search. The screen for the initial character search is configured to include a selectable character palette and allow the user to select and specify an initial character of an ingredient. When the initial character of the ingredient is selected, the screen in FIG. 1(b1) shifts to a screen in FIG. 1(c).

FIG. 1(c) illustrates the screen including options of large categories of ingredients or ingredient names each having the initial character specified by the user. When any of the large categories of ingredients or the ingredient names is selected, the screen in FIG. 1(c) shifts to FIG. 1(d).

FIG. 1(b2) illustrates an example of a screen for the category search. An example of the category search includes the large categories of ingredients to allow the user to select among the large categories of ingredients and specify the selected large category. When any of the large categories of ingredients is selected, the screen in FIG. 1(b2) shifts to a screen in FIG. 1(d).

FIG. 1(d) illustrates an example of a screen for selecting among sub-categories of the ingredient and specifying the selected sub-category. When the sub-category of the ingredient is selected, the screen in FIG. 1(d) shifts to a screen in FIG. 1(e).

FIG. 1(e) illustrates an example of a screen for selecting and specifying a second-item (second) ingredient. The screen displays the ingredient name of the ingredient corresponding to the specified sub-category and a list of ingredient names which allows the user to select and specify an ingredient to be cooked together with the ingredient corresponding to the specified sub-category. In the selectable ingredient list, "NO OTHER INGREDIENT" is an option that allows the user to selectively cook only the ingredient corresponding to the specified sub-category. When the second-item ingredient is selected, the screen in FIG. 1(e) shifts to a screen in 1(f).

FIG. 1(f) is the screen including a cooking recipe including the ingredient corresponding to the specified sub-category and the ingredient specified as a second item. The screen in FIG. 1(f) can include a recipe name "SASAMI (CHICKEN FILLET) AND SPINACH SALAD", an image of a dish (e.g., a photograph of the cooked dish or a video introducing how to cook), and an explanation of how to cook. In FIG. 1(e), when "NO OTHER INGREDIENT" is specified, the screen in FIG. 1(f) is replaced by a screen including a cooking recipe including the ingredient (a first item) corresponding to the specified sub-category. The screen can display a cooking recipe from which a meal can be cooked only from the one ingredient or the two ingredients selected by the user (except required seasoning).

According to the present embodiment, it is possible to simultaneously produce an economical value by allowing the user to cook a meal by using a cheaply available ingredient and a social value by reducing food waste at a supermarket.

For example, when the user specifies, on the screen of the application in FIG. 1(d), a first ingredient available as a clearance item at a supermarket, the screen of the application in FIG. 1(e) informs the user of a matching ingredient to be purchased to allow the user to easily cook a dish in a short time. If the matching ingredient is simultaneously on sale as a clearance item, purchasing the items leads to considerable budget saving. Since selling up clearance items without disposing thereof is a task of the supermarket, it is expected that the supermarket welcomes the purchase. In that sense, this application contributes to a society.

As described above, the one ingredient recipe in the application specifies one of the ingredients in the list and, when "NO OTHER INGREDIENT" is specified, a dish which can basically be cooked only from the ingredient is displayed alongside. However, required seasoning is not included therein. There are an unexpectedly large number of dishes that can be cooked from only one ingredient. Examples thereof include grilled fish, fried chicken, tomato with dressing, boiled spinach or potherb mustard with soy sauce dressing, salt rubbed cucumber, and the like. It can be said that, when such everyday meals are to be cooked, there is little need to dare to check the recipes thereof by using the smartphone application.

However, there are some ingredients shoppers hesitate to buy even when the ingredients are cheaply available at a supermarket because the shoppers do not know how to cook the ingredients or have little cooking knowledge. Such ingredients that do not remind the shoppers of recipes using only such ingredients are mostly rather special ingredients. Since a majority of people have not cooked such ingredients yet or do not know how to cook such ingredients, even though a shop stocks such ingredients on trial, such ingredients are rarely purchased and destined to a clearance item section. Since such ingredients are not purchased even at reduced prices, under current circumstances, a considerable number of such ingredients are finally disposed of. When an ingredient is sold and how to cook the ingredient is known only to a person familiar with cooking, if a simple recipe using only that ingredient can be referred to at a supermarket, it is expected that more people purchase that ingredient.

In addition, meals that can be cooked from one ingredient are limited to an extent. By combining a given ingredient with another additional ingredient, types of dishes that can be cooked increase at once. Accordingly, the application in the present embodiment has a mechanism such that, when a first ingredient is selected first (FIG. 1(d)) as illustrated in FIG. 1, a list of second ingredients to be combined with the first ingredient is subsequently displayed in addition to "NO OTHER INGREDIENT" (FIG. 1(e)) and, when a second ingredient is selected from the list, on the subsequent screen, a recipe name including a combination of the two ingredients, a photograph of a cooked dish, and a cooking process are simultaneously displayed. Therefore, when the user shopping at a supermarket finds a good-buy item, the user is allowed to know which ingredient is to be purchased simultaneously in addition to the good-buy item to complete a dish.

An application which combines three ingredients is also possible in principle but, when consideration is given to a more complicated smartphone screen and a need to immediately determine which ingredients are to be purchased during shopping, this application is rather unrealistic.

When two ingredient items are selected also, a cooking process preferably includes about three steps at most. The list of the ingredients is preferably provided by software which allows the user to select a preferred one of a list in an AIUEO order (Japanese alphabetical order) and a list of categories such as meat, fish, and vegetables.

Needless to say, it may also be possible to provide, for a tablet terminal having a screen larger than a smartphone screen, an application which introduces a cooking recipe including three ingredient items and a cooking process including steps the number of which is larger than about 3.

Figure 2:
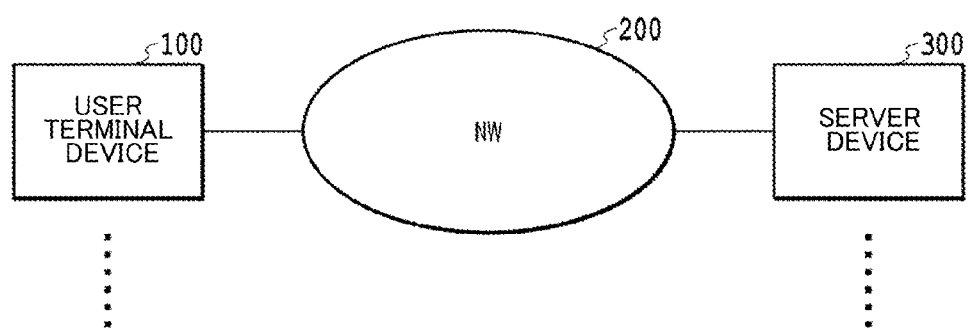
FIG. 2 is a schematic configuration diagram of a system according to the embodiment of the present invention.

FIG. 2 illustrates a schematic configuration of a system in the present embodiment. The system in the present embodiment includes a user terminal device 100 and a server device 300 which are connected via a network 200. The user terminal device 100 can be, e.g., a mobile phone, a smartphone, a tablet terminal, a portable digital assistant (PDA), a laptop computer, a notebook computer, or the like. The server device 300 can be, e.g., a stand-alone server machine, distributed server machines connected to each other via a network, or a virtual server machine mounted in a virtual environment a service of which is offered in a data center.

Figure 3:
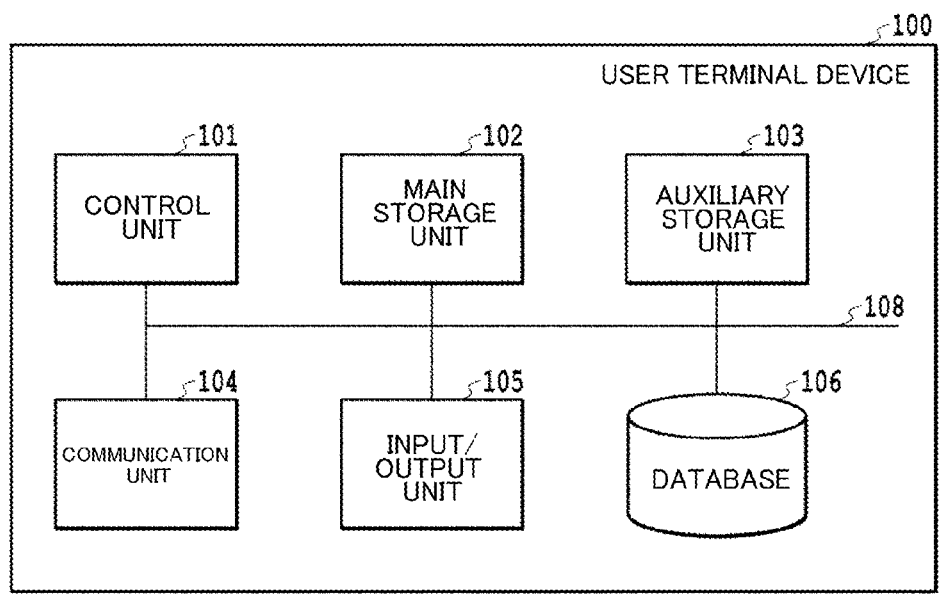
FIG. 3 is a diagram illustrating a configuration of hardware of the user terminal device according to the embodiment of the present invention.

FIG. 3 illustrates a configuration of hardware of the user terminal device 100. The user terminal device 100 includes a control unit 101, a main storage unit 102, an auxiliary storage unit 103, a communication unit 104, an input/output unit 105, and a database 106 which are connected to each other by a bus 108.

The control unit 101 is referred to also as a central processing unit (CPU) and can perform control of each of the inner components of the user terminal device 100 and arithmetic operations on data. The control unit 101 can also read various programs stored in the auxiliary storage unit 103 into the main storage unit 202 and execute the programs.

The main storage unit 102 is referred to also as a main memory and can store various received data, a computer-executable instruction, data after arithmetic processing performed in response to the instruction, and the like.

The auxiliary storage unit 103 is a nonvolatile storage device represented by a hard disk (HDD), a flash memory, or the like and can store data and programs for a long period of time.

The communication unit 104 is a communication device configured to transmit/receive a signal by a wired method and/or a wireless method and can transmit/receive various information to/from the server device 300 via the network 200.

The input/output unit 105 includes an input device and an output device. Examples of the input device include a computer mouse, a trackball, a touch pad, a touch panel, a pointing device including a stylus, a microphone, a button switch, a keyboard, a keypad, and the like. Examples of the output device include a display, a touch panel, a speaker, various lamps, and the like.

The database 106 is a database including various information described later. The database 106 may also be formed in the auxiliary storage unit 103 or formed in another nonvolatile storage device other than the auxiliary storage unit 103. The database 106 need not necessarily be included in the user terminal device 100. The database 106 may also be provided at a position accessible by the user terminal device 100. For example, the database may be provided in the server device 300 or may also be a database connected to the network 200 independently of the user terminal device 100 and the server device 300.

Figure 4:
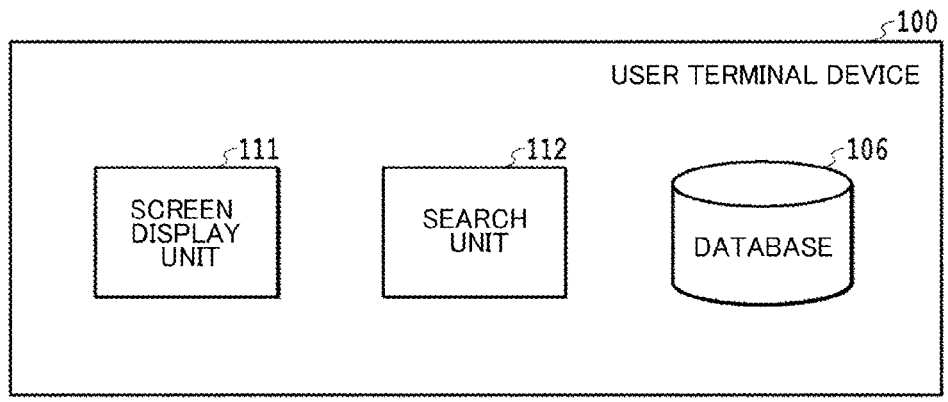
FIG. 4 is a diagram illustrating a configuration of functional blocks in the user terminal device according to the embodiment of the present invention.

FIG. 4 illustrates functional blocks in the user terminal device 100. The user terminal device 100 includes a screen display unit 111, a search unit 112, and the database 106.

The screen display unit 111 functions to shift a screen in response to an operation by the user, as illustrated in FIG. 1. The control unit 101 is configured to read the programs stored in the auxiliary storage unit 103 into the main storage unit 102, execute the programs, and thereby function as the screen display unit 111 either alone as the control unit 101 or in cooperation with the input/output unit 105 or another component.

The search unit 112 functions to perform, on the database 106, a search based on information (e.g., information about the ingredient specified by the user) in accordance with an operation by the user and return a search result to the screen display unit 111. For example, the search unit 112 performs, on the database 106, a search based on a character selected in the character palette and supplies, as a search result, ingredients or large categories thereof each having the character as an initial character thereof to the screen display unit 111. The search unit 112 also searches the database 106 based on the ingredient or the large category thereof selected by the user and supplies, as a search result, the sub-category of the ingredient to the screen display unit 111. The search unit 112 further searches the database 106 based on the ingredient (one ingredient or two ingredients) specified by the user and supplies, as a search result, cooking recipes including that of a dish of concern to the screen display unit 111. The control unit 101 reads the programs stored in the auxiliary storage unit 103 into the main storage unit 102 and executes the programs to thereby function as the search unit 112.

Figure 5:
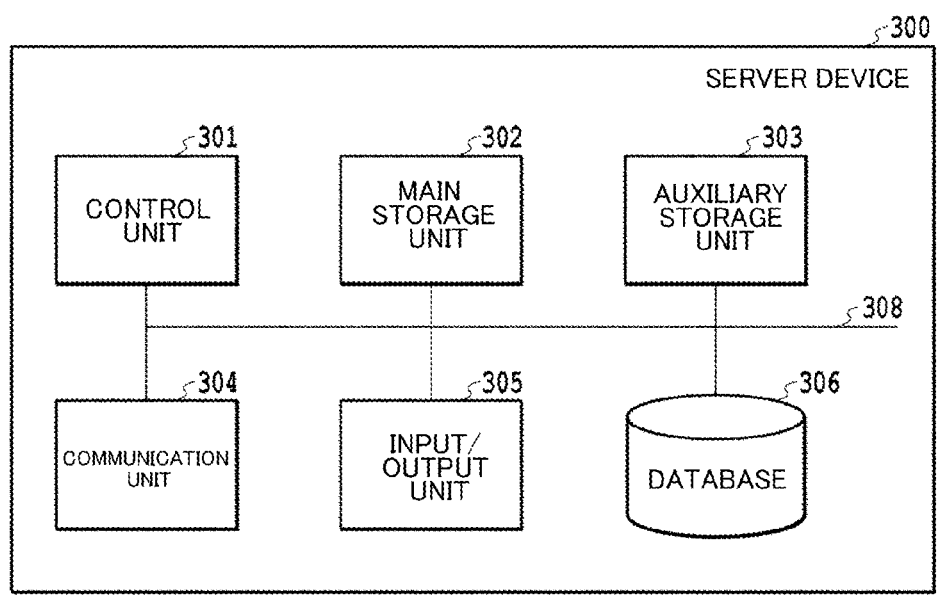
FIG. 5 is a diagram illustrating a configuration of hardware of a server device according to the embodiment of the present invention.

FIG. 5 illustrates a configuration of hardware of the server device 300. The server device 300 includes a control unit 301, a main storage unit 302, an auxiliary storage unit 303, a communication unit 304, an input/output unit 305, and a database 306.

The control unit 301 is referred to also as a main processing unit (CPU) and can perform control of each of the inner components of the server device 300 and arithmetic operations on data. The control unit 301 can also read various programs stored in the auxiliary storage unit 303 into the main storage unit 302 and execute the programs.

The main storage unit 302 is referred to also as a main memory and can store various received data, a computer-executable instruction, data after arithmetic processing performed in response to the instruction, and the like.

The auxiliary storage unit 303 is a nonvolatile storage device represented by a hard disk (HDD), a flash memory, or the like and can store data and programs for a long period of time.

The communication unit 304 is a communication device configured to transmit/receive a signal by a wired method and/or a wireless method and can transmit/receive various information to/from the user terminal device 100 via the network 200.

The input/output unit 305 includes, similarly to the input/output unit 105, an input device and an output device.

The database 306 is, similarly to the database 106, a database including various information described later. The database 306 may also be formed in the auxiliary storage unit 303 or formed in another nonvolatile storage device other than the auxiliary storage unit 303. The database 306 may also include a program to be executed by the control unit 101 of the user terminal device 100. The database 306 need not necessarily be included in the server device 300. The database 306 may also be provided at a position accessible by the server device 300. For example, the database may be provided in the user terminal device 100 or may also be a database connected to the network 200 independently of the user terminal device 100 and the server device 300.

Figure 6:
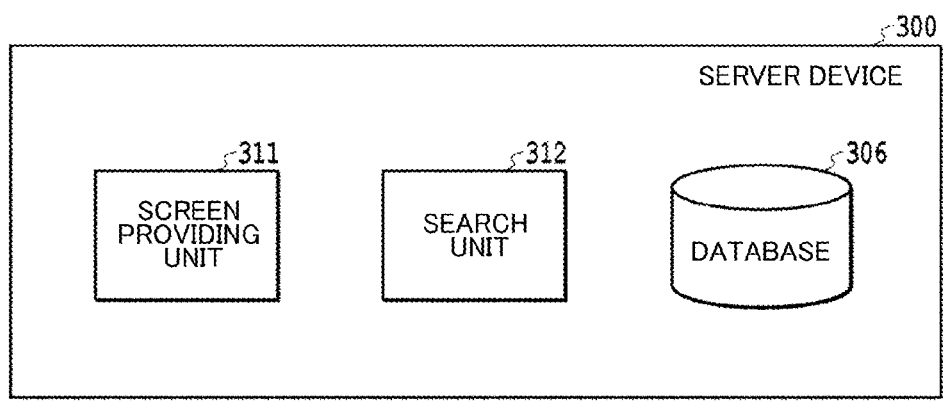
FIG. 6 is a diagram illustrating a configuration of functional blocks in the server device according to the embodiment of the present invention.

FIG. 6 illustrates functional blocks in the server device 300. The server device 300 includes a screen providing unit 311, a search unit 312, and the database 306.

The screen providing unit 311 functions to generate a screen to be displayed on the user terminal device 100 and provide the screen. The screen providing unit 311 can generate screens (e.g., FIGS. 1(*c*) to 1(*f*)) including information supplied from the search unit 312 and provide the screens. The screen providing unit 311 can also provide a screen (e.g., FIG. 1(*a*), (b1), or (b2)) produced in advance to the user terminal device 100.

The search unit 312 functions to perform, on the database 106, a search based on information from the user terminal device 100 and supply a search result to the screen providing unit 311. For example, the search unit 312 performs, on the database 306, a search based on a character selected in the character palette from the user terminal device 100 and supplies, as a search result, ingredients or large categories thereof each having the character as an initial character thereof to the screen providing unit 311. The search unit 312 also searches the database 306 based on the ingredient or the large category thereof selected by the user and supplies, as a search result, the sub-category of the ingredient to the screen providing unit 311. The search unit 312 further searches the database 306 based on the ingredient (one ingredient or two ingredients) specified by the user and supplies, as a search result, cooking recipes including that of the dish of concern to the screen providing unit 311. The control unit 301 reads the programs stored in the auxiliary storage unit 303 into the main storage unit 302 and executes the programs to thereby function as the search unit 312.

Next, an example of an operation of the application to be performed in the user terminal device 100 will be described.
(Stand-Alone Type)

Figure 7:
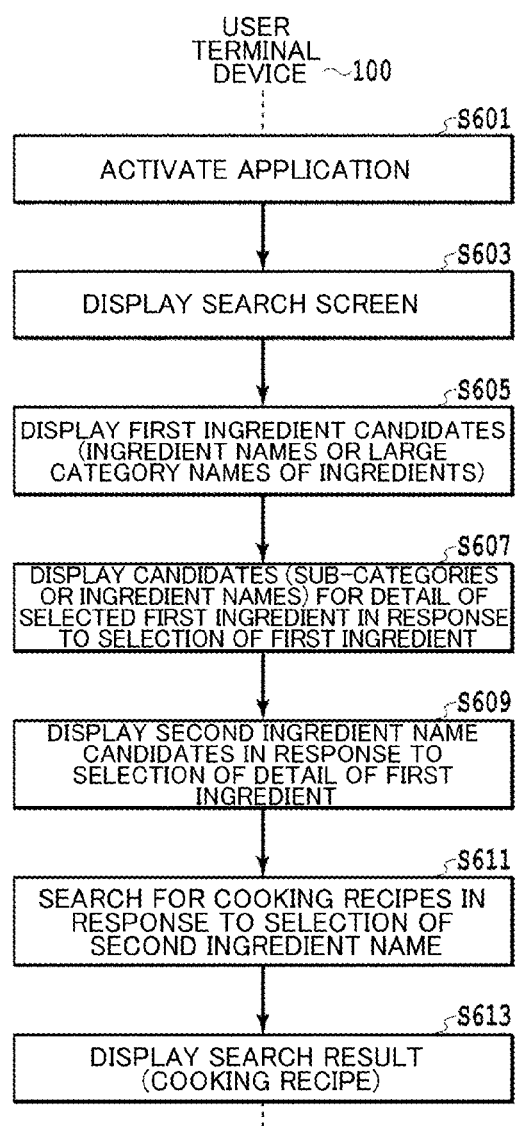
FIG. 7 is a flow chart illustrating an operation of the user terminal device according to the embodiment of the present invention.

FIG. 7 illustrates a flow chart of a stand-alone-type operation of the application in the user terminal device in the present embodiment. In the user terminal device 100, the application and the database 106 each downloaded from the server device 300 are installed and updated. The user terminal device 100 has a functional block configuration described with reference to FIG. 4.

In Step S601, the user terminal device 100 activates the application. The user terminal device 100 (screen display unit 111) displays the initial screen (FIG. 1(*a*)). The user selects the initial character search or the category search.

In Step S603, in response to the selection of the search by the user, the user terminal device 100 (screen display unit 111) displays the search screen. When the user selects the category search, the user terminal device 100 displays the large category screen (FIG. 1(*b*2)). When the user selects the initial character search, the user terminal device 100 (screen display unit 111) displays the character palette (FIG. 1(*b*1)).

In Step S605, the user terminal device 100 (screen display unit 111) displays, in response to the selection by the user, a screen including first ingredient candidates (ingredient names or large category names of ingredients). More specifically, when the category search is selected, the user terminal device 100 (search unit 112) searches, in response to the specification of the initial character in the character palette by the user, the database 106 for ingredient names or large categories of the ingredients each having the specified initial character, and returns the ingredient names or the large categories of ingredients each having the specified initial character to the screen display unit 111. The screen display unit 111 displays the screen (FIG. 1(*c*)) including the ingredient names or the large categories of ingredients as the first ingredient candidates. When the category search is selected, the screen display unit 111 displays the large category screen (FIG. 1(*b*2)) including the large categories of ingredients as the first ingredient candidates.

In Step S607, the user terminal device 100 (screen display unit 111) displays, in response to the selection of the first ingredient by the user, candidates for the detail of the selected first ingredient (sub-categories or ingredient names of the first ingredient). More specifically, in response to the selection of the first ingredient (ingredient name or large category of ingredients) from among the options by the user, the search unit 112 searches the database 106 for the sub-categories of the large category or ingredient name of the selected ingredient and returns the sub-categories to the screen display unit 111. The screen display unit 111 displays the screen (FIG. 1(*d*)) including the first ingredient detail candidates (candidates for the sub-category or ingredient name of the first ingredient).

In Step S609, the user terminal device 100 (screen display unit 111) displays, in response to the selection of the detail of the first ingredient by the user, a screen including second ingredient name candidates. More specifically, the search unit 112 searches, in response to the selection of the first ingredient by the user, the database 106 for candidates for the name of the second ingredient to be included together with the first ingredient in the dish and returns the second ingredient name candidates to the screen display unit 111. The screen display unit 111 displays the screen (FIG. 1(*e*)) including the second ingredient name candidates. The screen including the second ingredient name candidates may be configured to allow the first ingredient to be selected as only one ingredient (allow no second ingredient to be selected).

In Step S611, the user terminal device 100 (search unit 112) searches the database 106 for cooking recipes in response to the selection of the second ingredient or the selection of the first ingredient as only one ingredient by the user.

In Step S613, the user terminal device 100 (screen display unit 111) displays the screen (FIG. 1(*f*)) including the cooking recipe searched for by the search unit 112.

Thus, it is possible to provide, to the user, information for selecting a food menu item based on an ingredient, not for selecting an ingredient based on a food menu item.
Server-Client Type)

Figure 8:
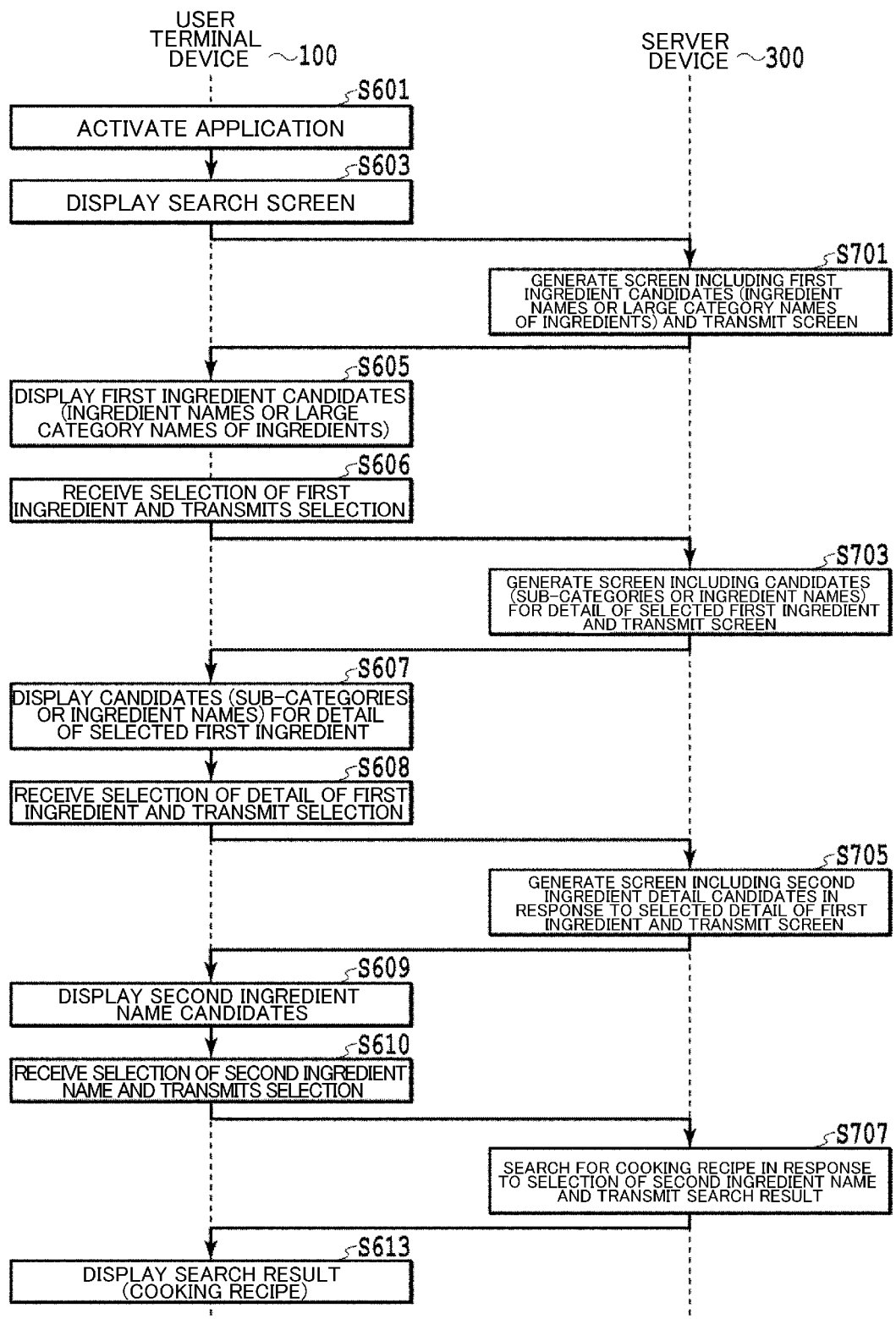
FIG. 8 is a flow chart illustrating an operation of the system according to the embodiment of the present invention.

FIG. 8 illustrates a flow chart of a server-client-type operation by the server device and the user terminal device in the present embodiment. In the user terminal device 100, the application downloaded from the server device 300 is installed and updated. The user terminal device 100 has the screen display unit 111 included in the functional block configuration described with reference to FIG. 4, but does not have the search unit 112 and the database 106. The server device 300 has the functional block configuration described with reference to FIG. 6. The server device 300 provides, to the user terminal device 100, a service of searching the database 306 and returning a search result thereto.

In Step S601, the application is activated. The user terminal device 100 (screen display unit 111) displays the initial screen (FIG. 1(*a*)). The user selects the initial character search or the category search.

In Step S603, the user terminal device 100 (screen display unit 111) displays, in response to the selection of the search by the user, the search screen. When the user selects the category search, the user terminal device 100 displays the large category screen (FIG. 1(b2)). When the user selects the initial character search, the user terminal device 100 (screen display unit 111) displays the character palette (FIG. 1(b1)). More specifically, the screen display unit 111 can display, depending on the selection of the search by the user, the large category screen (FIG. 1(b2)) or the character palette (FIG. 1(b1)) installed in advance as a portion of the application. Instead, it may also be possible that the server device 300 (screen providing unit 311) provides the large category screen or the character palette to the user terminal device 100 depending on the selection of the search by the user, and the screen providing unit 311 displays the provided screen.

In Step S701, the server device 300 (screen providing unit 311) generates, in response to the selection by the user, a screen including the first ingredient candidates (ingredient names or large category names of ingredients) and transmits the screen to the user terminal device 100. More specifically, when the category search is selected, the server device 300 (search unit 312) receives the initial character specified in the character palette by the user of the user terminal device 100, searches the database 306 for ingredient names or large categories of ingredients each having the specified initial character, and transmits a search result to the screen providing unit 311. The screen providing unit 311 generates the screen (FIG. 1(c)) including the ingredient names or the large categories of ingredients as the first ingredient candidates and provides the screen to the user terminal device 100. When the category search is selected, the server device 300 (search unit 312) searches the database 306 for the large categories or ingredient names and provides a search result to the screen providing unit 311. The screen providing unit 311 generates the screen (FIG. 1(b2)) including such large categories of ingredients or ingredient names as the first ingredient candidates and provides the screen to the user terminal device 100.

In Step S605, the user terminal device 100 (screen display unit 111) displays a screen including the first ingredient candidates (ingredient names or large category names of ingredients) in accordance with the selection by the user. More specifically, the user terminal device 100 (screen display unit 111) displays the screen (FIG. 1(b2) or (c)) including the large categories of ingredients or ingredient names provided by the server device 300 as the first ingredient candidates.

In Step S606, the user terminal device 100 receives the selection of the first ingredient by the user and transmits the selection to the server device 300.

In Step S703, the server device 300 (search unit 312) generates a screen including candidates (sub-categories of the ingredient name) for the detail of the first ingredient selected by the user of the user terminal device 100 and transmits the screen to the user terminal device 100. More specifically, the server device 300 (search unit 312) receives the selection of the first ingredient (the large category of ingredients or ingredient name) by the user of the user terminal device 100. The search unit 312 searches the database 306 for sub-categories of the large category or ingredient name of the selected ingredient and supplies a search result to the screen providing unit 311. The screen providing unit 311 generates the screen (FIG. 1(d)) including the first ingredient detail candidates (candidates for the sub-category or ingredient name of the first ingredient) and provides the screen to the user terminal device 100.

In Step S607, the user terminal device 100 (screen display unit 111) displays the first ingredient detail candidates (candidates for the sub-category or ingredient name of the first ingredient) in accordance with the selection of the first ingredient by the user. More specifically, the user terminal device 100 (screen display unit 111) displays the screen (FIG. 1(d)) including the first ingredient detail candidates provided by the server device 300.

In Step S608, the user terminal device 100 receives the selection (the detail of the first ingredient (the sub-category or ingredient name)) by the user from among the first ingredient detail candidates and transmits the selection to the server device 300.

In Step S705, the server device 300 (screen providing unit 311) receives the selected detail of the first ingredient, generates the screen (FIG. 1(e)) including second ingredient detail candidates, and transmits the screen to the user terminal device 100. More specifically, the server device 300 (search unit 312) searches the database 106 for candidates for the name of the second ingredient to be included together with the first ingredient in the dish and supplies a search result to the screen providing unit 311. The screen providing unit 311 generates the screen (FIG. 1(d)) including the second ingredient name candidates and provides the screen to the user terminal device 100. The screen including the second ingredient name candidates may be configured to allow the first ingredient to be selected as only one ingredient (allow no second ingredient to be selected).

In Step S609, the user terminal device 100 (screen display unit 111) displays a screen including the second ingredient name candidates in accordance with the selection of the detail of the first ingredient by the user. More specifically, the screen display unit 111 displays the screen (FIG. 1(e)) including the second ingredient name candidates provided by the server device 300.

In Step S610, the user terminal device 100 receives the selection (selection of the second ingredient name or the first ingredient as only one ingredient) by the user from among the second ingredient name candidates and transmits the selection to the server device 300.

In Step S707, the server device 300 (search unit 312) receives the selection of the second ingredient name or the selection of the first ingredient as only one ingredient by the user of the user terminal device 100, searches the database 306 for a cooking recipe, and supplies a search result to the screen providing unit 311. More specifically, when the second ingredient name is selected, the server device 300 (search unit 312) searches the database 306 for a cooking recipe including the first ingredient and the second ingredient. When the first ingredient is selected as only one ingredient, the server device 300 (search unit 312) searches database 306 for a dish including only the first ingredient. The screen providing unit 311 generates the screen (FIG. 1(f)) including the cooking recipe searched for, and provides the screen to the user terminal device 100.

In Step S613, the user terminal device 100 (screen display unit 111) displays the screen (FIG. 1(f)) including the cooking recipe provided by the server device 300.

Thus, it is possible to provide the user with information for selecting a food menu item based on an ingredient, not for selecting an ingredient based on a food menu item.

FIGS. 9 and 10 illustrate an example of a configuration of the database 106 or 306 in the present embodiment.

FIG. 9 is a data table in which large categories of ingredients are associated with subordinate categories thereof. The search unit 112 or 312 searches a data table as illustrated in FIG. 9 to be able to obtain the large category of the first ingredient selected by the user and the sub-categories of the ingredient name.

FIG. 10 is a data table in which names of dishes are associated with ingredients (the first ingredients and the second ingredients) included in the dishes. The search unit 112 or 312 searches a data table as illustrated in FIG. 10 to be able to obtain a recipe of a dish including the first ingredient and the second ingredient each selected by the user. In the example in FIG. 10, each of the dish names is associated with two ingredient items, but a dish name associated only with the first ingredient without being associated with the second ingredient may also be included therein.

EXAMPLE

For example, popular deli food sold in a basement of a department store is tasty because a variety of ingredients are used therein. However, on closer look, about two key ingredients are used therein in most cases. For instance, there is "CHICKEN AND GREEN VEGETABLE SALAD", and a main ingredient thereof is chicken fillet. To the chicken fillet, chopped chives, garlic scape, potherb mustard, pickled mustard stem, and the like are added and seasoned with a salt-flavored dressing. At a supermarket, chicken fillet is frequently sold as a clearance item. This is because chicken fillet is not used in a common chicken dish such as fried chicken or stew. In addition, chicken fillet is typically boiled and shredded to be used, but many people do not know such a cooking procedure. To cook a similar dish from two ingredient items, it is important to leave, as a matching ingredient, which one of chive, garlic scape, potherb mustard, pickled mustard stem, and the like. Instead of the three ingredients of chive, garlic scape, and potherb mustard, salad spinach can be used representatively. Since freshness is important to salad spinach, salad spinach is extremely likely to be sold as a clearance item. In addition, pickled mustard stem is also sold as a clearance item in most cases. Only chicken fillet and pickled mustard stem result in a dish containing no vegetable but, since umami of pickled mustard stem goes well with a light taste of chicken fillet, these two are matching ingredients.

The following is a screen displayed on a user terminal device such as a smartphone. When the user selects the category on the initial screen (FIG. 1(*a*)), the screen shifts to the large category screen (FIG. 1(*b*2)). When the user selects "TORI-NIKU (CHICKEN)", the screen shifts to the sub-category screen (FIG. 1(*d*)). Alternatively, when the user selects "AIUEO (JAPANESE ALPHABET)" on the initial screen and further selects "TO" on the screen (FIG. 1(*b*1)) including the character palette, the screen (FIG. 1(*c*)) including ingredients having names each beginning with "TO" is displayed and, when the user selects "TORI-NIKU", the screen shifts to the sub-category screen (FIG. 1(*d*)). When the user selects "SASAMI (CHICKEN FILLET)" on the sub-category screen, the screen shifts to a second ingredient selection screen (FIG. 1(*e*)). Under and on the right side of "SASAMI", "SALAD HOURENSO (SPINACH)", "ZA-SAI (PICKLED MUSTARD STEM)", "NEGI (GREEN ONION)", "PIMAN (GREEN PEPPER)", and the like each as only one ingredient or a matching ingredient are displayed. When the "SALAD HOURENSO" is selected herein, the screen shifts to a cooking recipe screen (FIG. 1(*f*)), and a recipe name "chicken fillet with spinach salad", a photograph of a cooked dish, and a cooking process are displayed. Explanation of the cooking process is such that: (1) boil chicken fillet and shred boiled chicken; (2) cut salad spinach into appropriately sized pieces; and (3) dress chicken and spinach with a salt-flavored dressing.

The invention claimed is:

1. A system comprising:
a user terminal device;
a server device; and
a database including cooking recipes,
the server device including a search unit configured to:
search the database in response to receiving information about a first ingredient from the user terminal device, the user terminal device being located in a location where the first ingredient is available for purchase by a user of the user terminal device when the information about the first ingredient is received from the user terminal device, and acquire a second ingredient to be cooked together with the first ingredient;
search the database based on a specification of the second ingredient received from the user terminal device and in response to receiving the information about the first ingredient and the specification of the second ingredient from the user terminal, acquire a first cooking recipe including the first ingredient and the second ingredient; and
search the database in response to receiving a specification of the first ingredient as only one ingredient from the user terminal device and acquire a second cooking recipe including only the first ingredient in response to receiving the specification of the first ingredient,
the user terminal device including a screen display unit configured to:
display a screen including a list of the first ingredient and the second ingredient, the list of the first ingredient including first listing showing a general category of the first ingredient and a second listing showing a sub-category of the first ingredient, the second listing being shown upon receipt of user input that selects the general category of the first ingredient in the first listing;
display a screen including the first cooking recipe including the first ingredient and the second ingredient in response to a specification of the second ingredient in the list, the first cooking recipe including no more than three cooking steps that specify how to prepare the first cooking recipe; and
display a screen including the second cooking recipe including only the first ingredient in response to a specification of the first ingredient as the only one ingredient in the list, the second cooking recipe including no more than three cooking steps that specify how to prepare the second cooking recipe.

2. A server device connected to a user terminal device, the server device comprising:
a search unit configured to:
search a database in response to receiving information about a first ingredient from the user terminal device, the user terminal device being located in a location where the first ingredient is available for purchase by a user of the user terminal device when the information about the first ingredient is received from the user terminal device, and acquire a second ingredient to be cooked together with the first ingredient;
search the database based on a specification of the second ingredient received from the user terminal device and in response to receiving the information about the first ingredient and the specification of the second ingredient from the user terminal, acquire a first cooking recipe including the first ingredient and the second ingredient, the first cooking recipe including no more than three cooking steps that specify how to prepare the first cooking recipe; and search the database in response to receiving a specification of the first ingredient as only one ingredient from the user terminal device and acquire a second cooking recipe including only the first ingredient in response to receiving the specification of the first ingredient, the second cooking recipe including no more than three cooking steps that specify how to prepare the second cooking recipe.

3. A method to be implemented by a system including a user terminal device, a server device, and a database including cooking recipes, the method comprising the steps of:

the server device searching the database in response to receiving information about a first ingredient from the user terminal device, the user terminal device being located in a location where the first ingredient is available for purchase by a user terminal device when the information about the first ingredient is received from the user terminal device, and acquiring a second ingredient to be cooked together with the first ingredient;

the user terminal device displaying a screen including a list of the first ingredient and the second ingredient, the list of the first ingredient including a first listing showing a general category of the first ingredient and a second listing showing a sub-category of the first ingredient, the second listing being shown upon receipt of user input that selects the general category of the first ingredient in the first listing;

the server device searching the database based on a specification of the second ingredient received from the user terminal device and in response to receiving the information about the first ingredient and the specification of the second ingredient from the user terminal, acquire a first cooking recipe including the first ingredient and the second ingredient;

the user terminal device displaying a screen including the first cooking recipe including the first ingredient and the second ingredient in response to a specification of the second ingredient in the list, the first cooking recipe including no more than three cooking steps that specify how to rep e the first cooking recipe;

the server device searching the database in response to receiving a specification of the first ingredient as only one ingredient from the user terminal device and acquire a second cooking recipe including only the first ingredient in response to receiving the specification of the first ingredient; and the user terminal device displaying a screen including the cooking recipe including only the first ingredient in response to a specification of the first ingredient as the only one ingredient in the list, the second cooking recipe including no more than three cooking steps that specify how to prepare the second cooking recipe.

* * * * *